Sept. 18, 1962 R. F. J. FILIPOWSKY 3,054,956

DETECTOR FOR SYMBOLIC WAVEFORMS

Filed Nov. 18, 1959 3 Sheets-Sheet 1

WITNESSES

John E. Healy, Jr.

James F. Young

INVENTOR

Richard F. J. Filipowsky

BY D. W. Cleary

ATTORNEY

Sept. 18, 1962 R. F. J. FILIPOWSKY 3,054,956

DETECTOR FOR SYMBOLIC WAVEFORMS

Filed Nov. 18, 1959 3 Sheets-Sheet 2

Sept. 18, 1962 R. F. J. FILIPOWSKY 3,054,956

DETECTOR FOR SYMBOLIC WAVEFORMS

Filed Nov. 18, 1959 3 Sheets-Sheet 3

United States Patent Office 3,054,956

Patented Sept. 18, 1962

3,054,956
DETECTOR FOR SYMBOLIC WAVEFORMS

Richard F. J. Filipowsky, Glen Burnie, Md., assignor to Westinghouse Electric Corporation, East Pittsburgh, Pa., a corporation of Pennsylvania Filed Nov. 18, 1959, Ser. No. 853,935
2 Claims. (Cl. 325—329)

The present invention relates generally to demodulator circuits, and more specifically but not exclusively to a detector for detecting message signals having symbolic type waveforms.

Many pulse transmission systems operate with a relatively small duty cycle, i.e., they radiate energy only during a small fraction of the total transmission time. Consequently, the transmission of a continuous carrier would be a waste of energy and would block the receiver, such as in radar. For these reasons and to increase the efficiency, double sideband suppressed carrier amplitude modulation is frequently employed. In recovering the information transmitted in double sideband suppressed carrier transmission, carrier injection or synchronous detection are usually employed. In both of these detection methods, it is necessary to employ a local frequency of the correct phase and frequency in order to extract the information transmitted. In suppressed carrier transmission the polarity of the original modulating waveform can only be recovered when observing absolute phase of the carrier wave. To recover this signal completely, it is ncessary to reinsert at the receiver a carrier with the correct phase. This, of course, presents difficult and expensive problems to overcome and the carrier insertion at the receiver end is necessarily critical.

Accordingly, it is an object of the invention to provide a detector for message signals employed in double sideband suppressed carrier transmission system.

Another object of the invention is the provision of a detector for an amplitude modulated suppressed carrier system in which message signals can be easily detected with a high degree of accuracy, from noise signals.

A further object of the invention is to provide a detector for suppressed carrier transmission system which is not dependent upon any synchronism with the carrier frequency or carrier phase of the original suppressed carrier.

A still further object of the invention is the provision of a detector for a pulse type transmission system, that can be employed in synchronous operation without any dependence upon synchronism with the carrier frequency or carrier phase of the original suppressed carrier.

Other objects of the invention will be apparent from the following description taken in conjunction with the accompanying drawings, in which.

Figure 3:
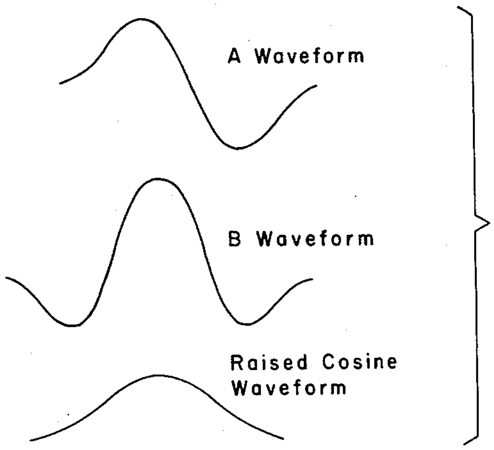
FIG. 3 is a graphical representation of waveforms useful in explaining the invention.
Figure 4:
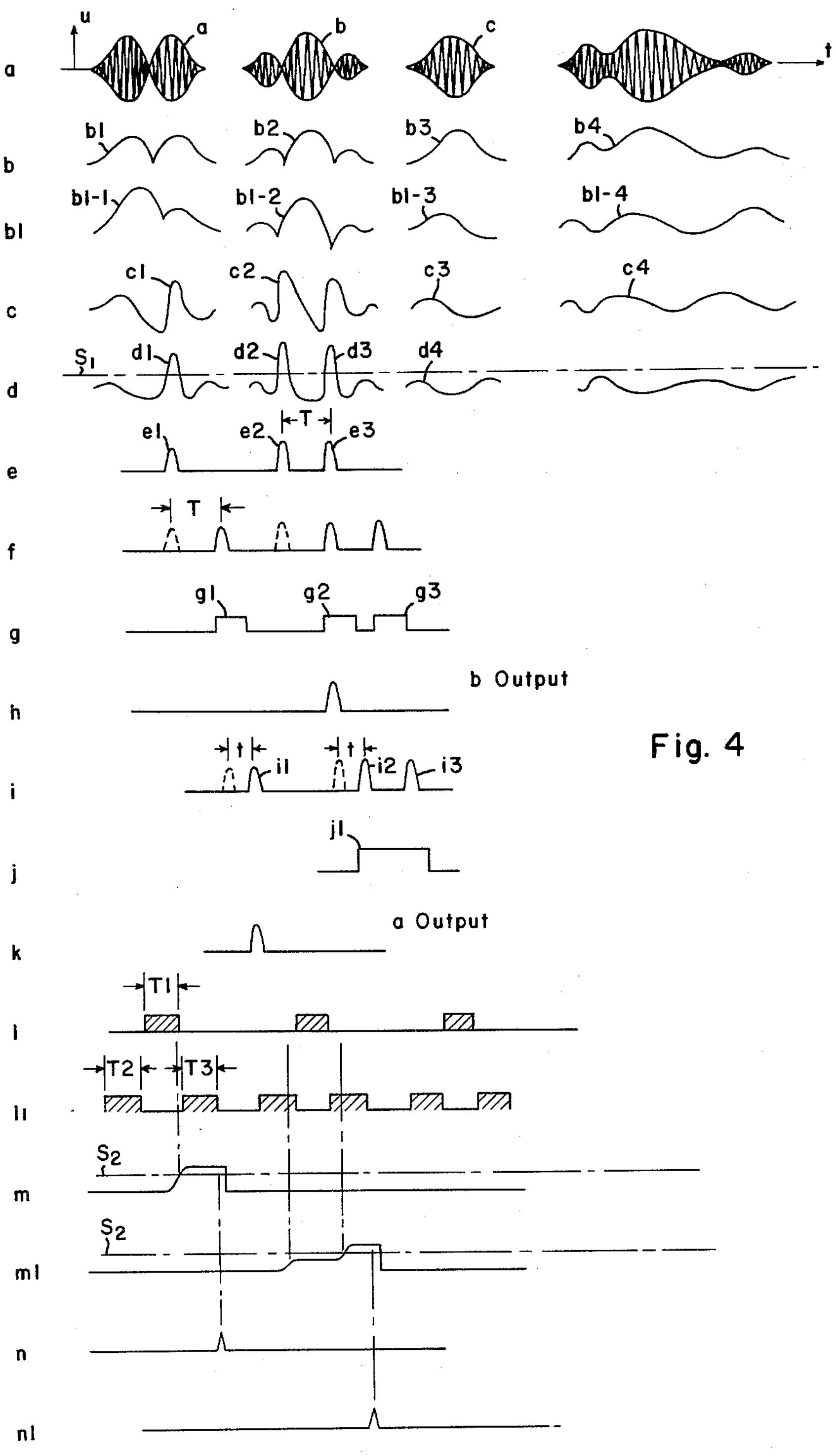
FIG. 4 is a graphical representation of waveforms useful in explaining the invention.

In my copending application Serial No. 845,548, filed October 9, 1959 entitled, "Phase Proof Signal Transmission System," with assignee's identification No. 31,286, there is disclosed a quaternary transmission system for transmitting binary information and employing double sideband suppressed carrier transmission. The system disclosed in this copending application translates binary information at the transmitting end into a four letter alphabet to be transmitted and later detected so as to extract the original binary information. As disclosed in this copending application, the transmission system employed utilizes double sideband suppressed carrier transmission modulated by the waveforms shown in 3A and 3B to constitute two letters of the transmission alphabet. These modulating waveforms modulate about the same center frequency. The other two letters of the alphabet employ a raised cosine waveform as the modulating wave, shown in FIG. 3C but the modulation is about two separate center frequencies above and below the center frequency about which the waveforms shown in 3A and 3B modulate. The waveforms identified as A waveform and B waveform, shown in FIG. 3, are described in more detail in my copending application Serial No. 833,450, filed August 13, 1959 entitled "Signal Transmission System," having assignee's identification No. 31,180. The raised cosine waveform shown in FIG. 3 is employed as the modulating signal for two letters of the quaternary alphabet. This waveform is the modulating signal for two of the letters, however, the center frequency about which this signal produces sidebands, is different for these two letters. Additionally, these two center frequencies are different from the center frequency employed as the carrier frequency for the first two letters which employ the waveforms shown in FIGS. 3A and 3B as the modulating waveforms. Hence, two letters of the quaternary alphabet, disclosed in the above copending application, can be detected by their carrier frequency. The two message signals which employ the A and B waveforms shown in FIG. 3 are illustrated in FIG. 4(*a*) as the *a* and *b* signals. These signals illustrate a double sideband suppressed carrier signal wherein the A and B waveforms shown in FIG. 3 are the modulating signals. As can be seen from FIG. 4(*a*), these two message signals *a* and *b* fail to display any polarity of the original modulating wave, which could only be determined by the insertion of the proper phase and frequency of the carrier or center frequency. The *c* signal shown in FIG. 4(*a*) is produced by using the raised cosine waveform shown in FIG. 3 as the modulating signal in double sideband suppressed carrier modulation. The other signal in FIG. 4(*a*) illustrates a signal caused by noise.

Figure 1:
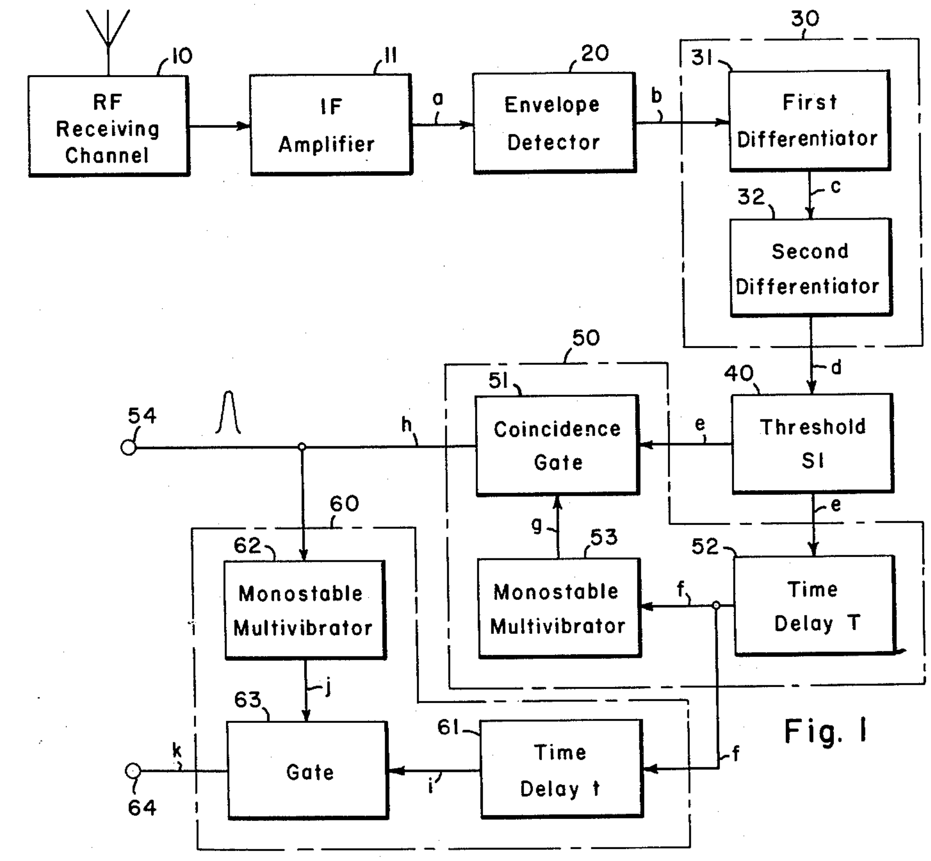
FIGURE 1 is a schematic diagram in block form of apparatus employing one embodiment of the invention.

More specifically, viewing FIGS. 1 and 4, the double sideband suppressed carrier message signals having waveforms similar to those as shown in FIG. 4(*a*), namely, those illustrated by *a*, *b* and *c*, will be received at the receiving station through an R.F. receiving channel 10 as shown in FIG. 1. The output of the R.F. channel 10 is fed to an I.F. amplifier 11. The I.F. amplifier 11 will only pass the essential frequency band for the double sideband waveform and will limit the noise exactly to that band. The output of the I.F. amplifier 11 will pass the message signals having waveforms similar to those illustrated in FIG. 4(*a*). It will be noted that noise alone will have an envelope which will rarely go to zero and if it ever goes to zero it will do so gradually. FIG. 4(*a*) illustrates such a typical noise signal with the corresponding envelope. It will be noted that the envelope of band limited noise has a Rayleigh distribution and this distribution has zero probability density at zero level, whereas the Gaussian distribution of the I.F. noise has maximum probability density at zero level.

The waveforms illustrated in FIG. 4(*a*) occur at the point *a* illustrated in FIG. 1, the waveforms illustrated in FIG. 4(*b*) occur at the point *b* shown in FIG. 1. FIG. 4(*b*1) illustrates waveforms occurring at point *b* which have been substantially altered due to disturbances encountered during transmission. The remainder of the waveforms illustrated in FIG. 4 are identified in FIG. 1 as occuring at the corresponding points identified by the line numbers shown in FIG. 4. The output signals from the I.F. amplifier 11, and illustrated in FIG. 4(*a*) are then applied to an envelope detector 20, such as a conventional diode type envelope detector. The result of the envelope detection of the waveforms shown in FIG. 4(*a*) is the waveforms shown in FIG. 4(*b*) or 4(*b*1). Viewing FIGS. 4(*a*) and 4(*b*), it can be seen that a signal has one phase reversal or null and the *b* signal has two phase reversals or nulls. These phase reversals or nulls occur at the point in the waveform shown in FIG. 3 where the waveform changes polarity. By rectifying these waveforms, the point at which the waveform has 180° phase reversal, is quite sharp since the upper half of the envelope is relatively steep approaching and leaving the point of phase reversal or null. The second differential of the waveforms shown in FIGS. 4(*b*) and 4(*b*1) will, therefore, have a maximum or peak value at the point at which the waveforms reverse phase. The *c* type waveform shown in FIG. 4(*a*) will pass through the envelope detector 20 so as to produce a waveform similar to that shown in FIGS. 4(*b*) or 4(*b*1).

These waveforms do not reverse phase during the message interval and hence the second differential thereof will be relatively low. The result of noise passing through the envelope detector 20 will be a waveform similar to that shown in FIG. 4(*b*) or 4(*b*1). As stated above although noise may approach zero, which it seldom does, it will generally only approach zero gradually so that even though it may reach zero, the output resulting therefrom at the envelope detector will not display any sharp peaks similar to those shown for signals *a* and *b*.

Thus, the waveforms *b*1–1 and *b*1–2 shown in FIG. 4 can be detected relative to waveform *b*1–3 and the noise envelope, by obtaining the second differential of the waveforms *b*1–1 and *b*1–2. This is done by feeding the output of the envelope detector 20 to a differentiating means 30 comprising a first differentiator 31 and a second differentiator 32. The output of the first differentiator 31, that is the first differential of the waveform shown in FIG. 4(*b*1), are illustrated in FIG. 4(*c*) as waveforms *c*1, *c*2, *c*3 and *c*4. The output of the second differentiator 32 is illustrated in FIG. 4(*d*) as waveforms *d*1, *d*2, *d*3 and *d*4. Thus, it is clearly illustrated that the second differential of the envelopes *b*1–1 and *b*1–2 produce at the null or phase reversal thereof, intermediate the ends of the message signal, relatively large positive going pulses. The envelope *b*1–1 produces one pulse intermediate the ends thereof whereas the envelope *b*1–2 produces two pulses intermediate the ends of the envelope. The second differential of the envelopes *b*1–3 and *b*1–4 on the other hand fail to produce a pulse of any substantial magnitude at the output of the second differentiator 32. By passing the output of the differentiator 32 through a threshold 40 having a threshold S1, the "*a*" type signal will result in one positive peak near the center of the message interval, the "*b*" type signal will produce two positive going pulses intermediate the ends of the message interval. However, the *c* signal and the noise shown in FIG. 4 will not result in any output through the threshold 40.

At the output of the threshold 40 the signals *a* and *b* are detected from signal *c* and noise. In order to detect the signal *a* from the signal *b*, the output of the threshold 40 is applied to a first indicating means 50. This indicating means 50 comprises a coincidence gate 51 which is directly connected to the output of the threshold 40 so as to receive the signals illustrated by waveforms shown in FIG. 4(*e*). These waveforms are also applied to a time delay 52 which delays the output of the threshold 40 a time T to produce an output shown in FIG. 4(*f*). The time T is a period of time slightly less than the time length between the phase reversals or nulls of the waveform *b*. The output of the time delay 52 is applied to a monostable multivibrator 53 so as to produce rectangular waveforms in response to pulses being applied thereto. The resulting rectangular waveforms, shown in FIG. 4(*g*) are applied to a coincidence gate 51. The rectangular pulses G shown in FIG. 4(*g*) are effective to render the gate 51 conductive and only during the application of these rectangular pulses will the gate 51 pass signals emanating from the threshold 40. Hence an output pulse at the output terminals 54 of the first indicating means 50 indicates that a *b* type signal has been transmitted.

If only a single pulse is applied to the gate 51, during a message interval, as a result of receiving an "*a*" type signal, there will be no resulting output pulse at the output terminals 54 since the gate 51 will be rendered conductive by the pulse *g*1 delayed a time T after the occurrence of the pulse *e*1. When the resulting rectangular waveform *g*1 is applied to the coincidence gate 51 to render it conductive, there will be no output to pass through the gate 51 from the threshold 40. Hence, there will be no output pulse at the output terminals 54 due to an "*a*" type signal being received at the receiver station. If, however, a "*b*" type signal is received at the receiver station, the rectangular gate *g*2 shown in FIG. 4(*g*) resulting from the pulse *e*2 will be applied to the coincidence gate 51 from the monostable multivibrator 53 in time coincidence with the second pulse *e*3 effected by a *b* signal.

As stated above the delay time T is slightly less than the time between the two null pulses *d* from a "*b*" type signal.

The rectangular waveforms *g* are of such a time length that when combined with the time length T is less than the time spacing between two adjacent null pulses *d* from two adjacent "*b*" type signals. This necessarily makes the combined time length of the waveforms *g* and the time period T less than the time spacing between the adjacent two null pulses *d* from adjacent "*a*" and "*b*" type signals. The combined length of T and pulse *g* being adjusted small enough so that the gate 51 will not be rendered conductive by a pulse *d* from a first waveform when a pulse *d* appears at gate 51 from the next succeeding waveform. A second indicating means 60 is provided to provide an output pulse when an "*a*" type signal is received at the receiving station. The second indicating means 60 comprises a time delay circuit 61 having a delay of *t* which is applied to the input of a normally open gate 63. The signals passing through the time delay 61 will pass through the gate 63 if the gate 63 is not biased to a nonconductive state by a monostable multivibrator 62. The output of the time delay 52 shown in FIG. 4(*f*) is applied to the time delay 61 so as to delay these pulses a time period in length *t* as shown in FIG. 4(*i*). If an output pulse occurs at the output of the coincidence gate 51, it actuates a monostable multivibrator 62 so as to produce a rectangular waveform shown in FIG. 4(*j*). The rectangular waveform *j*1 will render the gate 63 nonconductive a period of time sufficient to prevent the passage of the pulses *i*2 and *i*3 (*d*2 and *d*3), resulting from a "*b*" type signal, from passing through the gate 63. When, however, an "*a*" type signal is applied the resulting pulse *i*1 (or *d*1) shown in FIG. 4(*i*) will not produce an output at the output terminals 54 but will be passed directly through time delays 52 and 61 and thence through gate 63 to the output terminals 64. Thus, it is seen that the indicating means 60 will produce an output pulse only when an "*a*" type signal has been received since the pulses *i*2 and *i*3 will not pass through gate 63 because the monostable multivibrator 62 will block this gate during that period of time.

Summarizing briefly the operation of the embodiment shown in FIG. 1, the signals and noise which appear at the input of the detector will be passed through an envelope detector 20 so as to provide a rectified envelope output shown in FIG. 4(*b*). The envelope of the signal *a* provides a sharp null in the middle of the signal interval whereas the envelope of the *b* signal provides two sharp nulls intermediate the ends of the message signal. This is in contrast to the envelope of the raised cosine message signal $b3$ which has no nulls or phase changes intermediate the ends thereof. The envelope of the noise $b4$ shown in FIG. 4($b$) may have a null, however, a noise will ordinarily approach this null gradually. Consequently, the second differential of the noise envelope shown in FIG. 4($b$) will result in only two of the signals having a positive going pulse which will exceed the predetermined threshold S1 of threshold 40, as illustrated in FIG. 4($d$). The signal "$a$" will effect one positive going pulse from the threshold 40 and the signal "$b$" will effect two positive going pulses at the output of the threshold 40. When two positive pulses such as $d2$ and $d3$ shown in FIG. 4($d$) occur at the output of the threshold 40, they will provide an output pulse at output terminals 54. When only one pulse appears during a message interval such as pulse $d1$ at the output of the threshold 40, it will indicate in the output pulse at the output terminals 64. The pulse $d3$ will be prevented from passing gate 63 and providing an "$a$" signal output indication due to the monostable multivibrator 62 which will normally bias the gate 63 nonconductive.

Figure 2:
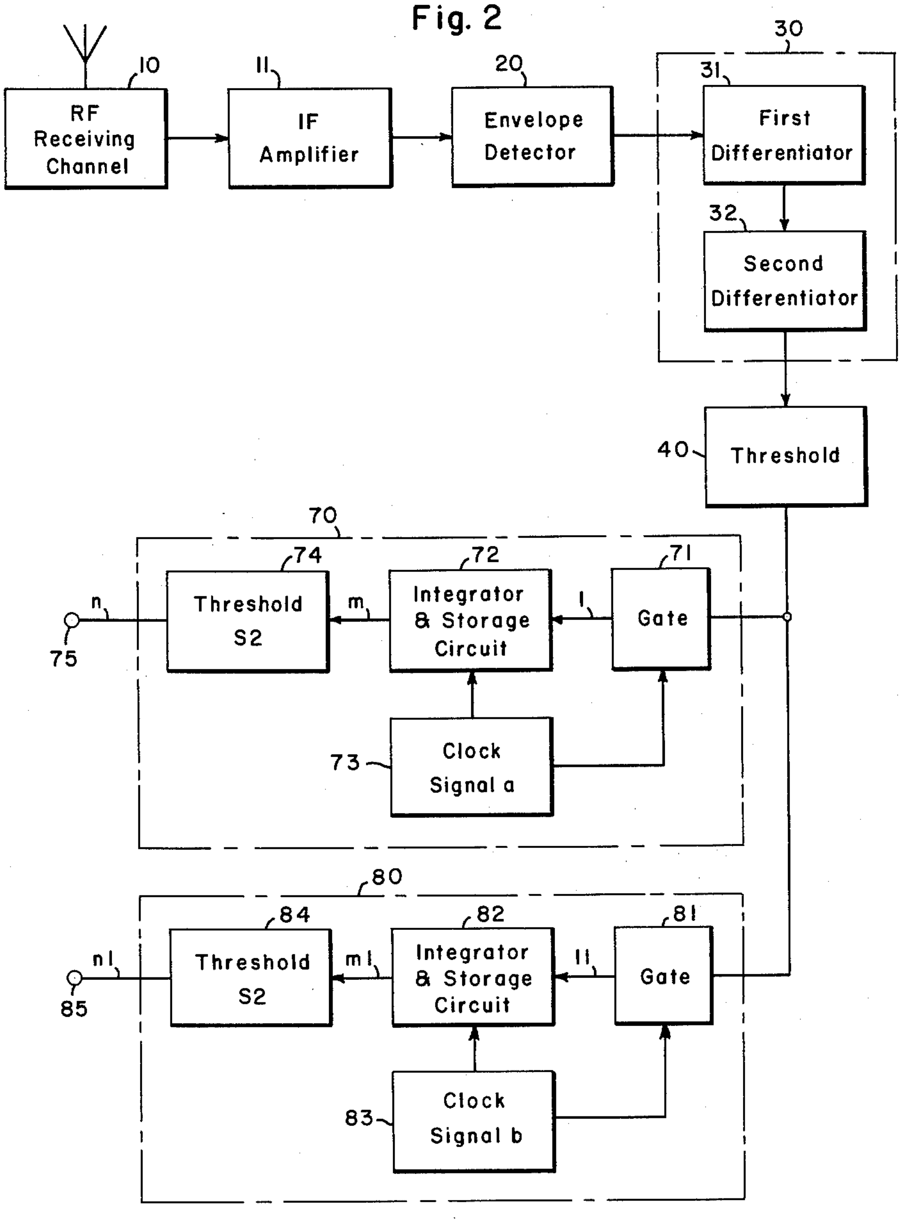
FIG. 2 is a schematic diagram in block form of an apparatus employing another embodiment of the invention.

The embodiment of the invention illustrated in FIG. 2 is employed in synchronous or timed operation when the time of arrival and the message interval time is known at the receiving station. The embodiment shown in FIG. 2 includes similar to the embodiments shown in FIG. 1, an R.F. receiving channel 10, I.F. amplifier 11, envelope detector 20 and differentiating means 30 including the first differentiator 31 and a second differentiator 32. The output of the second differentiator 32 is applied to the threshold 40. The output of the threshold 40 in the embodiment shown in FIG. 2 will be the same as the output of the threshold 40 shown in the embodiment in FIG. 1. For the purposes of illustration this output waveform will be as illustrated in FIG. 4($e$) for the signals received and described above in explaining the operation of the embodiments shown in FIG. 1. These signals shown in FIG. 4($e$) will be applied to a first clocked indicating means 70 and a second clocked indicating means 80. The clocked indicator 70 will provide an output pulse at the output terminal 75 when an "$a$" type signal is present or received. When a "$b$" type signal is received there will be an output pulse at the output terminals 85 of the second clocked indicating means.

In clocked or synchronous operation, the time of arrival of the beginning, center and end of each waveform are known. This information is generally available in the form of small trigger pulses from a master timer. The clocked indicating means 70 comprises a gate 71, an integrator and storage circuit 72 which is fed into a threshold 74. The gate 71 is rendered conductive for a period of time T1 shown in FIG. 4($l$), by the clock 73. The period of time T1 is an interval during which the maximum second differential and null of the $a$ signal would occur if it was in fact received. If the second differential of the envelope $b1$ exceeds a predetermined threshold as in pulse $d1$, it will pass through gate 71 and be applied to the integrator and storage circuit 72. The integrator and storage circuit 72 is turned on by the clock 73 at the beginning of the sampling period T1, so that any pulse passing threshold 40 during this period will be applied to the integrator 72 and stored. The clock 73 will reset the integrator 72 and discharge the storage circuit thereof at the end of the message interval during which the null pulse $d1$ may occur. The integration of the signal occurring during the time T1 is held in the integrator and storage circuit 72 until the end of the signal interval. At the end of the interval, the storage circuit is discharged by clock 73 and applied to the threshold 74 and simultaneously the integrator is reset to zero by clock 73. If the output of the integrator and storage circuit, when discharged by the clock 73, exceeds a threshold S2 as shown in FIG. 4($m$) there will be an output pulse occurring at the output terminal 75 as shown in FIG. 4($n$). This will be a positive indication that an "$a$" signal had been received by the receiving station. It will be noted that the integrator 72 will integrate only during the time period T since the gate 71 will only be opened during this time to apply energy to the integrator and be stored in the storage unit thereof. The pulses $d2$ and $d3$ resulting from the "$b$" signal will not pass gate 71 to provide a positive output indication at the output terminals 75 since they occur before and after time period T1.

The second clocked indicator means 80 provides an output pulse at output terminals 85 when there is a "$b$" type signal present. This second indicator means has similar components as the first indicator means 70 and comprises a normally closed gate 81, an integrator and storage circuit 82, a clock 83, and a threshold 84. In the operation of the second indicator means 80 the clock 83 renders the gate 81 conductive for a time period T2 and T3 as shown in FIG. 4(L1). These time periods correspond to the time during which the second derivatives in the "$b$" type signal will occur. Viewing FIGS. 4($d$), 4(L1) and 4($ml$), it is seen that during time period T2 a first pulse will pass through the gate 81 when a "$b$" type signal is present. This pulse will be integrated by integrator 82 during time period T2 and will be held by the storage of this circuit. The clock 83 will effect a second time period T3 during which the second pulse of the second derivative of the "$b$" type signal will occur, rendering the gate 81 conductive. When the gate is rendered conductive during period T3, it will pass the second pulse of the waveform $d3$ and apply it to the integrator and storage circuit 82 so that the energy stored therein by the two pulses $d2$ and $d3$ will exceed the threshold S2 of threshold 84 as shown in FIG. 4($ml$). At the end of the message interval, the clock 83 will discharge and reset the integrator 82 so as to apply the stored energy to the threshold 84. When there is a "$b$" type signal present, this threshold will be exceeded as shown in FIG. 4($ml$) and an output pulse will occur at the output terminals 85 as shown in FIG. 4($nl$). After the end of the message interval therefor the integrators 72 and 82 are discharged and reset to zero by clocks 73 and 83 so that they are ready for sampling during the next message interval.

It will be understood that the thresholds 74 and 84 can be adjusted to the optimum level so that noise during the respective sampling periods will virtually never effect an output indication, but the integration of pulses $d1$ and $d2$ and $d3$ will effect an output at terminals 75 and 85 respectively.

Whereas the invention has been shown and described with respect to embodiments thereof, it should be understood that changes may be made and equipment substituted wtihout departing from the spirit and scope of the invention.

I claim as my invention:

1. A detector for detecting double sideband suppressed carrier message signals transmitted within a predetermined frequency range, said signals including a first signal having a null located intermediate the ends thereof in a predetermined first position, a second signal having a null located intermediate the ends thereof at a second position, detecting means for detecting said signals, differentiating means for producing the second differential of said detected signals, first sampling means connected to said differentiating means for producing an output signal in response to a null in said first position and second sampling means connected to said differentiating means for producing an output signal in response to a null in said second position.

2. A detector for detecting message signals transmitted within a predetermined range of frequencies, said signals including a first double sideband suppressed carrier signal whose envelope has a maximum second derivative intermediate the ends thereof occurring during the first time period, a second double sideband suppressed carrier signal with an envelope having a maximum second derivative located intermediate the ends thereof and occurring during a second time period; detecting means for detecting said signals, differentiating means for producing the second differential of said detected signals, a first sampling means for producing a first output signal in response to a second derivative of the envelope of said signals occurring during said first time period, and a second sampling means for producing a second output signal in response to the second derivative of the envelope of the received signal exceeding a predetermined threshold during said second time period.

References Cited in the file of this patent

UNITED STATES PATENTS

| | | |
|---|---|---|
| 1,638,437 | Gannett et al. | Aug. 9, 1927 |
| 2,659,823 | Vossberg | Nov. 17, 1953 |
| 2,761,897 | Jones | Sept. 4, 1956 |
| 2,784,311 | Kahn | Mar. 5, 1957 |